United States Patent
Zhang et al.

(10) Patent No.: US 6,532,321 B1
(45) Date of Patent: Mar. 11, 2003

(54) FIBER OPTIC ISOLATOR FOR USE WITH MULTIPLE-WAVELENGTH OPTICAL SIGNALS

(75) Inventors: B. Barry Zhang, Lawrenceville, NJ (US); Liang-Ju Lu, Eden Prairie, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 09/505,077

(22) Filed: Feb. 16, 2000

(51) Int. Cl.[7] .............. G02B 6/26; G02B 6/42
(52) U.S. Cl. ............. 385/27; 385/47; 385/24; 385/11; 372/703
(58) Field of Search .............. 385/27, 47, 24, 385/11; 372/703

(56) References Cited

U.S. PATENT DOCUMENTS

| | | |
|---|---|---|
| 4,486,071 A | 12/1984 | Levinson |
| 4,548,478 A * | 10/1985 | Shirasaki ............ 359/256 |
| 4,653,042 A | 3/1987 | D'Auria et al. |
| 4,707,057 A | 11/1987 | Takahashi et al. |
| 4,712,880 A | 12/1987 | Shirasaki |
| 5,214,728 A | 5/1993 | Shigematsu et al. |
| 5,237,445 A | 8/1993 | Kuzuta |
| 5,255,332 A | 10/1993 | Welch et al. |
| 5,262,892 A * | 11/1993 | Nakamura ............ 359/484 |
| 5,381,261 A | 1/1995 | Hirai et al. |
| 5,402,509 A | 3/1995 | Fukushima |
| 5,629,995 A | 5/1997 | Duck et al. |
| 5,754,321 A | 5/1998 | Giles et al. |
| 5,822,095 A | 10/1998 | Taga et al. |
| 5,825,950 A * | 10/1998 | Cheng ............ 385/27 |
| 5,917,648 A | 6/1999 | Harker |
| 5,930,039 A | 7/1999 | Li et al. |
| 6,002,503 A | 12/1999 | Mizrahi |
| 6,289,152 B1 | 9/2001 | Zhang et al. |
| 6,297,896 B1 | 10/2001 | Kikuchi et al. |
| 6,310,718 B1 * | 10/2001 | Saeki ............ 359/110 |

FOREIGN PATENT DOCUMENTS

| | | |
|---|---|---|
| EP | 0 115 443 A2 | 1/1984 |
| EP | 0 325 152 A2 | 1/1989 |
| EP | 0 779 687 | 6/1997 |
| EP | 0 878 722 A1 | 11/1998 |
| EP | 11 145538 | 5/1999 |
| EP | 0 964 275 A1 | 12/1999 |
| EP | 0 994 595 A2 | 4/2000 |
| EP | 1 024 541 A2 | 8/2000 |
| FR | 2 775 795 | 9/1999 |
| JP | 11-145538 * | 5/1999 |
| JP | 11145540 | 5/1999 |
| JP | 11215058 | 6/1999 |
| WO | 01/61402 A1 | 8/2001 |

* cited by examiner

Primary Examiner—Cassandra Spyrou
Assistant Examiner—Leo Boutsikaris
(74) Attorney, Agent, or Firm—Altera Law Group, LLC

(57) ABSTRACT

A fiber optic isolator device is used by fiber optic systems operating at more than one wavelength. The device may be inserted anywhere within the fiber network. The fiber optic device permits the separation of the wavelengths so that an optical isolator module can isolate a first wavelength without significantly affecting the second wavelength. This device is useful isolating a communications signal at 1.55 μm while avoiding significant losses for an optical time domain reflectometry signal, for example at 1.3 μm.

29 Claims, 14 Drawing Sheets

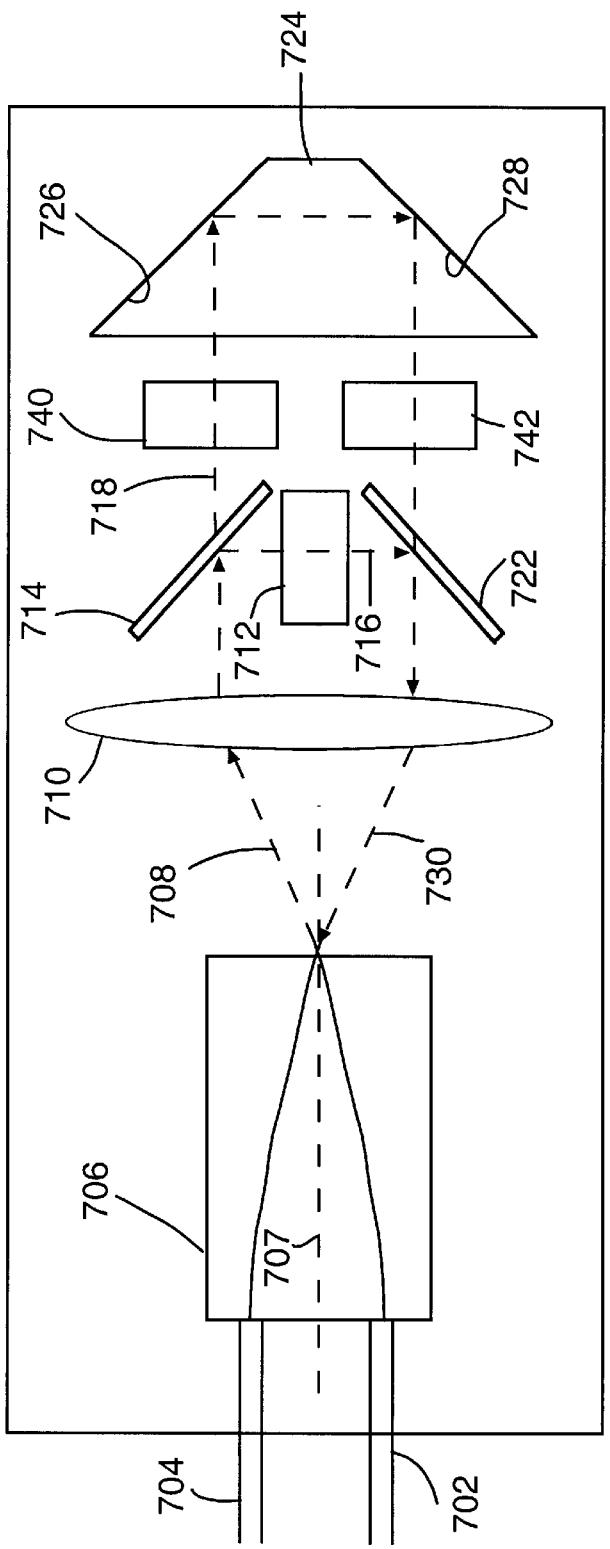
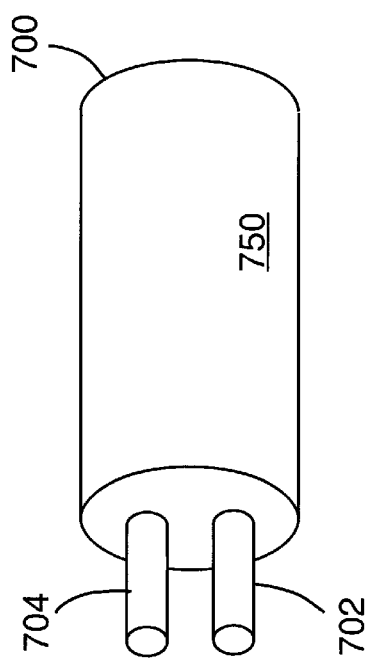
FIG. 7A
FIG. 7B

FIBER OPTIC ISOLATOR FOR USE WITH MULTIPLE-WAVELENGTH OPTICAL SIGNALS

FIELD OF THE INVENTION

The present invention is directed generally to a fiber optic isolator, and more particularly to a fiber optic isolator for fiber optic systems operating at multiple wavelengths.

BACKGROUND

Optical fibers find many uses for directing beams of light between two points. Optical fibers have been developed to have low loss, low dispersion, and polarization maintaining properties and can also act as amplifiers. As a result, optical fiber systems find widespread use, for example in optical communication applications.

It is not uncommon for an optical fiber system to support the transport of light at two or more wavelengths. For example, the communications signal propagating along the fiber may have a wavelength of, or be within a wavelength range centered at, about 1.55 μm, while a diagnostic signal may also be sent along the fiber, having a wavelength of approximately 1.3 μm. The diagnostic signal may be, for example, an optical time domain reflectometry (OTDR) signal. Other wavelengths that may be used in the same fiber as the communications signal include a pump signal for pumping an optical amplifier. For example, where the optical signal is at about 1.55 μm, the pump signal may be at about 980 nm for pumping an erbium-doped fiber amplifier, or at about 1.48 μm for pumping a fiber Raman amplifier.

It is common to isolate a fiber signal source from a fiber amplifier by placing an isolator between the two. However, the isolator may introduce loss to the other wavelength component propagating within the fiber. For example, an isolator positioned between the transmitter and a fiber amplifier transmits both the optical communications signal and the OTDR signal in the forward direction. In the reverse direction, the isolator introduces large losses for the optical communications signal. However, the isolator also introduces significant losses for the OTDR signal in the reverse direction, which interferes with the ability to use OTDR as an effective diagnostic tool in a fiber system.

Therefore, there is a need to provide an isolator that is effective at introducing high losses at one wavelength in the reverse direction, but which introduces little loss to a second wavelength in the reverse direction.

In other situations, it may be desired to provide isolation at two wavelengths. However, the bandwidth over which an isolator is effective is limited. Where the two wavelengths are separated by more than the effective bandwidth of the isolator, only one of the wavelengths is isolated effectively.

Therefore, there is a need for a fiber optic isolator that can operate effectively for two wavelengths having a relatively wide separation.

SUMMARY OF THE INVENTION

Generally, the present invention relates to an isolator device for use in fiber optic systems that operate with light at more than one wavelength. The isolator device may be inserted anywhere within the fiber network. One particular embodiment of the invention permits the separation of the wavelengths so that an optical isolator module can operate on that separated wavelength without operating on the other wavelength component or components. The different wavelengths may then be recombined. In another embodiment of the invention, different wavelengths may be combined into a single fiber, with an optical isolator module being disposed to operate on one of the wavelengths.

One particular embodiment of the invention is a fiber optic isolator device having a first optical fiber optically coupled to transmit light at first and second wavelengths along a first optical path. A wavelength separator is disposed on the first optical path and is adapted to direct light at the first wavelength along a second optical path and light at the second wavelength along a third optical path different from the second optical path. A wavelength combiner is optically coupled to combine light propagating along the second and third optical paths into a fourth optical path and a second optical fiber optically coupled to the fourth optical path. A first optical isolator module is disposed along the second optical path between the wavelength separator and the wavelength combiner to transmit light at the first wavelength passing from the first fiber to the second fiber, and to substantially block light at the first wavelength from passing from the second fiber to the first fiber.

Another embodiment of the invention is a fiber optic device that has wavelength separating means for separating a light beam into a first light beam containing light at a first wavelength and a second light beam containing light at a second wavelength different from the first wavelength, the first and second beams respectively propagating along first and second beam paths. Optical isolating means is disposed on the first beam path for passing light in the first wavelength from the wavelength splitting means to the wavelength combining means, and for blocking light at the first wavelength from passing from the wavelength combining means to the wavelength splitting means. The device also includes wavelength combining means for combining light propagating in the first direction along the first beam path, and light propagating in the first direction along the second beam path into a single output beam.

Another embodiment of the invention is a fiber optic device that has first and second optical fibers optically coupled via first and second optical paths respectively to a wavelength combiner. Light at a first wavelength from the first optical fiber is combined with light at a second wavelength from the second fiber at the wavelength combiner to form a combined output beam. A third optical fiber is coupled via a third optical path to receive the combined output beam from the wavelength combiner. A first optical isolator module is positioned on the first optical path to pass light at the first wavelength from the first optical fiber to the wavelength combiner, and to substantially block light at the first wavelength from passing from the wavelength combiner to the first optical fiber.

In another embodiment of the invention, a fiber optic device includes a first optical fiber optically coupled via a first optical path to a wavelength separator to transmit light to the wavelength separator. The wavelength separator is arranged to separate light received from the first optical fiber into components at first and second wavelengths. A second optical fiber is coupled via a second optical path to the wavelength separator to receive light at the first wavelength. A third optical fiber is coupled via a third optical path to the wavelength separator to receive light at the second wavelength. A first isolator module is positioned on the second optical path to transmit light at the first wavelength from the wavelength separator to the second optical fiber and to substantially block transmission of light at the first wavelength from the second optical fiber to the wavelength separator.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIG. 7A schematically illustrates another embodiment of a multiwavelength isolator device according to the present invention;

FIG. 7B schematically illustrates a terminal isolator device;

Figure 1:
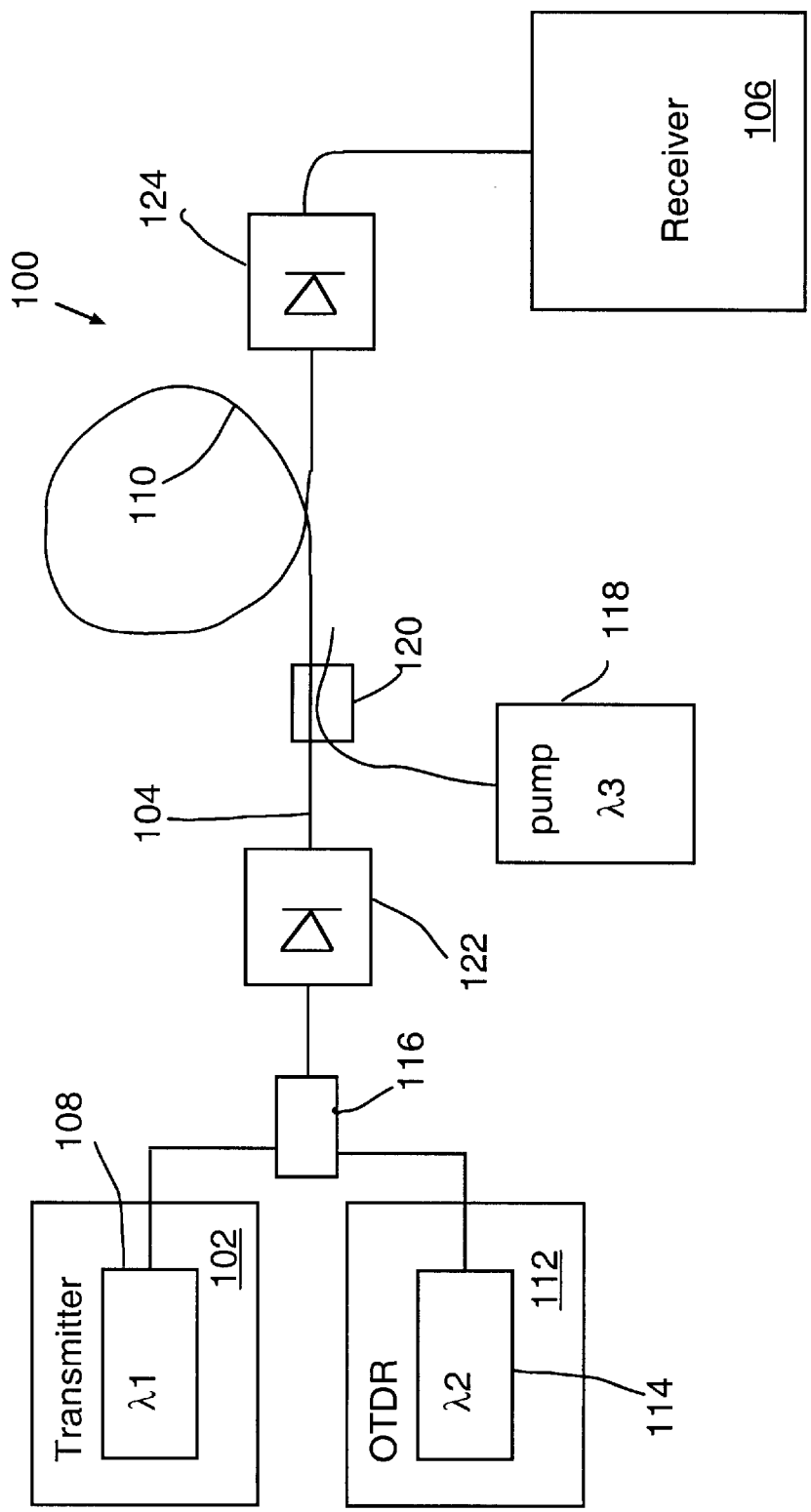
FIG. 1 schematically illustrates a fiber optic communications system.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is applicable to optical fiber systems, and is believed to be particularly suited to optical fiber communication systems in which light propagates along the fiber at more than one wavelength.

A fiber system 100 operating at more than one wavelength is illustrated in FIG. 1. The fiber system 100 includes a fiber optic communications channel 104 coupled between a transmitter 102 and a receiver 106. The transmitter 102 includes a light source 108 operating at a first wavelength, $\lambda 1$. For example, the light source 108, may generate a communications signal at approximately 1.55 $\mu$m, or may generate a band of individual wavelengths at about 1550 nm, such as a multiplexed optical communications signal.

A diagnostic light source 112, for example an optical time domain reflectometer (OTDR), includes a light source 114 operating at a second wavelength $\lambda 2$, for example 1.3 $\mu$m. Light from the OTDR is combined with light from the transmitter in a combiner 116 and launched into the fiber channel 104.

The fiber channel 104 includes an amplifier section 110, for example an erbium-doped fiber amplifier. A pump laser 118, operating at a third wavelength, $\lambda 3$, is coupled via a fiber coupler 120 to the fiber channel 104. Where the amplifier section 110 is an erbium-doped fiber amplifier, the third wavelength is typically around 980 nm. Where the amplifier section is a stimulated Raman amplifier, the third wavelength may be approximately 1.47 $\mu$m.

A first isolator 122 is positioned on the fiber channel 104 before coupler 120 to prevent the propagation of amplified, backscattered signals to the transmitter 108. A second isolator 124 may be positioned at the output end of the amplifier section 110 to prevent feedback of signals into the amplifier that may reduce the amplifier gain for the forward travelling communications signal at $\lambda 1$.

Light at two wavelengths passes through the first isolator 122, at $\lambda 1$ and $\lambda 1$ and $\lambda 2$. The isolator 122 ideally has negligible loss in the forward direction for signals at $\lambda 1$, and has a high loss for signals at $\lambda 1$ in the reverse direction. Also, the isolator 122 should permit the OTDR signal at $\lambda 2$ to pass with negligible loss in both the forward and the backward directions. To achieve such operation, the isolator 122 may be may be of the type discussed below.

Light of at least two wavelengths passes through the second isolator 124. Like the first isolator 122, the second isolator 124 ideally transmits the OTDR signal at $\lambda 2$ with negligible loss in both directions, while passing the communications signal at $\lambda 1$ with negligible loss only in the forward direction, and substantially blocks light at $\lambda 1$ from passing in the backwards direction.

Figure 2A:
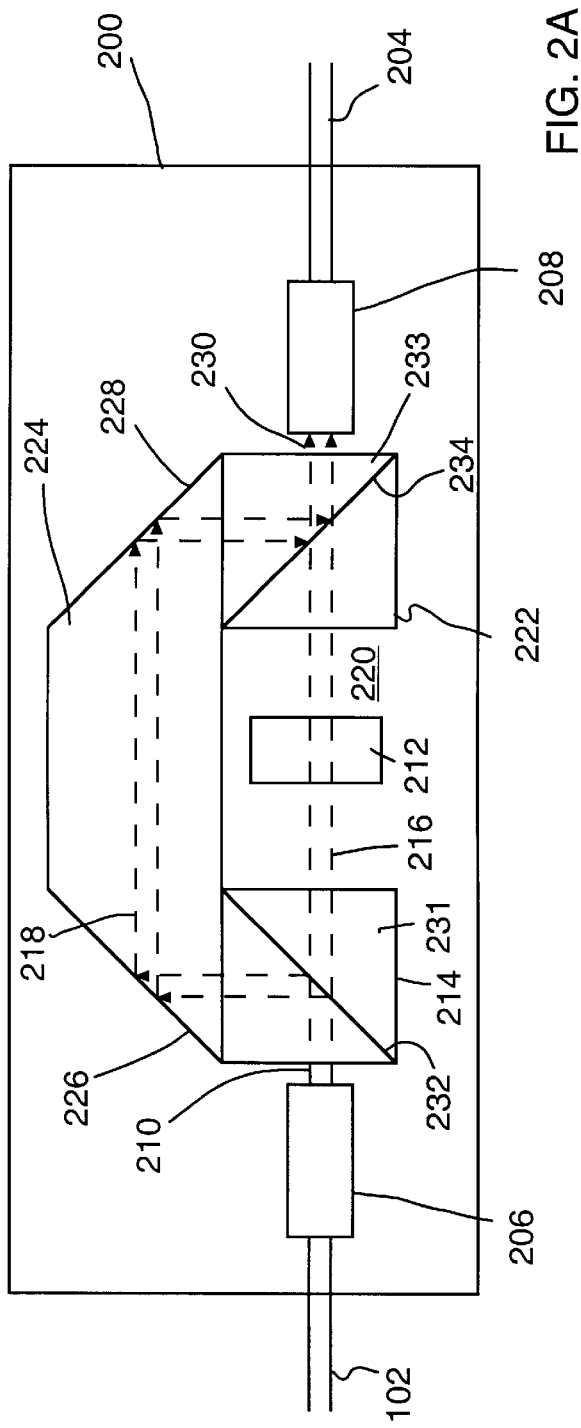
FIG. 2A schematically illustrates a multiwavelength isolator device according to an embodiment of the invention.
Figure 2B:
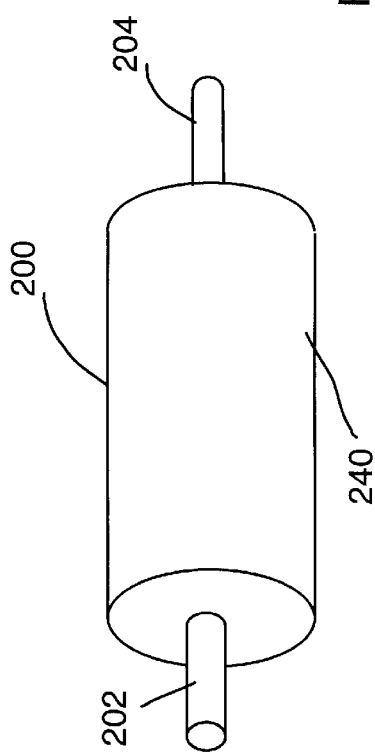
FIG. 2B schematically illustrates an in-line isolator device.

One particular embodiment of a fiber optic isolator device operating at more than one wavelength is schematically illustrated in FIG. 2A. The device 120 has two fibers 202 and 204 that couple to the external fiber optic system. The device 200 is in an "in-line" configuration, having one fiber at each end. An advantage of this configuration is that the overall width of the device package is small. A view of the "in-line" package is illustrated in FIG. 2B, illustrating the device housing 240, with the two fibers 202 and 204 attached at either end of the housing 240.

Each fiber 202 and 204 is terminated by a respective collimating lens 206 and 208 to reduce coupling losses between the two fibers 202 and 204. Light 210 propagating from the first fiber 202 may contain one or more wavelength components. For the present discussion, it is assumed that two wavelength components are present, namely $\lambda 1$ and $\lambda 2$. Light at $\lambda 1$ may be, for example, a communications signal at 1.55 $\mu$m, while the light at $\lambda 2$ is an OTDR signal at 1.3 $\mu$m. The second wavelength component may also be, for example, pump light for an amplifier, such as 1.48 $\mu$m or 980 nm. The second wavelength component may be separated from the first wavelength component by at least 20 nm.

In the particular embodiment shown, it is desired that an optical device 212 operate only on the light at one wavelength, λ1, while the optical device 212 does not operate on the light at λ2. Accordingly, the wavelength components λ1 and λ2 are separated by a wavelength separator 214 into two components 216 and 218 respectively, propagating along different optical paths. The first component 216, at λ1, is transmitted by the wavelength separator 214 and propagates through the first free space region 220 between the wavelength separator 214 and the wavelength combiner 222. The first wavelength component 216 passes through the optical device 212 positioned in the free space region 220.

The second wavelength component 218 is directed from the wavelength separator 214 along a path different from the path of the first wavelength component 216. A guiding prism 224 has two reflective surfaces 226 and 228 that direct the second wavelength component 218 to the wavelength combiner 222, where the first and second wavelength components 216 and 218 are combined into a single output beam 230 that propagates to the second collimating lens 208 and is focused into the second fiber 204. The prism 224 may be, for example, a roof-top prism.

The figure illustrates only light passing from the first fiber 202 to the second fiber 204. It will be appreciated that light may also pass from the second fiber 204 to the first fiber 202. However, the isolator module 212 prevents light at λ1 from passing back into the first fiber 202 from the second fiber 204. Since the light at λ2 bypasses the isolator module 212, the light at λ2 may pass from the second fiber 204 to the first fiber 202.

The wavelength separator 214 is any device that separates the light beam 210 into two wavelength components. In the particular embodiment illustrated, the wavelength separator is a beamsplitter cube 231 having a dichroic reflector 232 that transmits light at one wavelength, λ1, and reflects light at the other wavelength, λ2. The wavelength combiner 222 may be the same device as the wavelength separator 214, only operating in reverse. In the embodiment shown, the wavelength combiner 222 is a beamsplitter cube 233 that includes a dichroic reflector 234 that transmits the light at λ1, and reflects the light at λ2.

Other types of wavelength separator and combiner may also be employed. For example, the wavelength separator may be a dispersing prism that separates light at different wavelengths into different paths. Such a prism also operates as a wavelength combiner, wherein light at different wavelengths introduced into the prism at selected angles emerges at the same angle. Another type of wavelength separator and/or combiner may be a diffraction grating.

Figure 3:
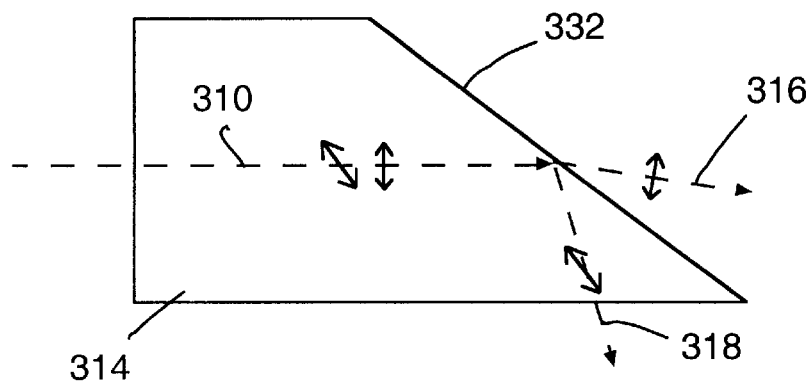
FIG. 3 schematically illustrates a polarization based wavelength separator.

The wavelength separator and/or combiner may also operate on a principle that depends on the polarization of light, for example as illustrated in FIG. 3. The separator 314 is formed from a birefringent material. The single light beam 310 propagates within the separator to the reflecting surface 332. The first wavelength component 316 propagates in a first polarization, with an associated first refractive index n1. The second wavelength component 318 propagates through in a second polarization, orthogonal to the first polarization, with an associated second refractive index n2, where n2>n1. The surface 332 is cut at such an angle that the second wavelength component 318 is totally internally reflected, whereas the first wavelength component is transmitted at the surface 332. It will be appreciated that such a polarization dependent device may also be used to combine light of different wavelengths, having different polarizations.

The guiding prism 224 is provided to direct the second wavelength component 218 from the wavelength separator 214 to the wavelength combiner 222. It will be appreciated that other components may also be provided to serve this function. For example, two separate mirrors placed at the positions of the reflecting surface 226 and 228 of the prism may be used as a substitute for the prism 224.

The isolator module 212 may be any suitable type of isolator module that allows passage of light at one wavelength in the forward direction, but prevents passage of light in the backwards direction.

Figure 4A:
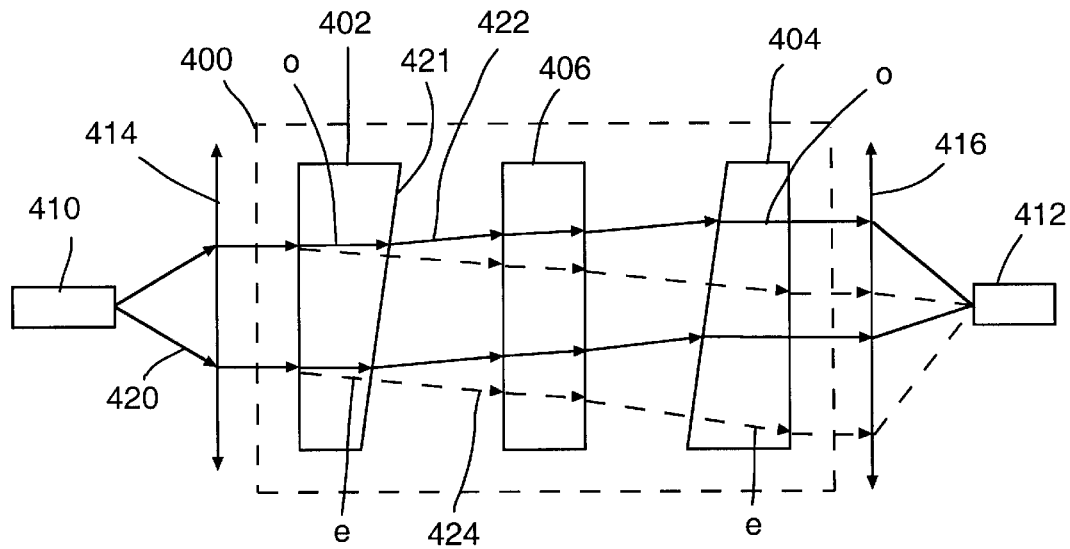
FIGS. 4A and 4B schematically illustrate a first embodiment of an isolator module.
Figure 4B:
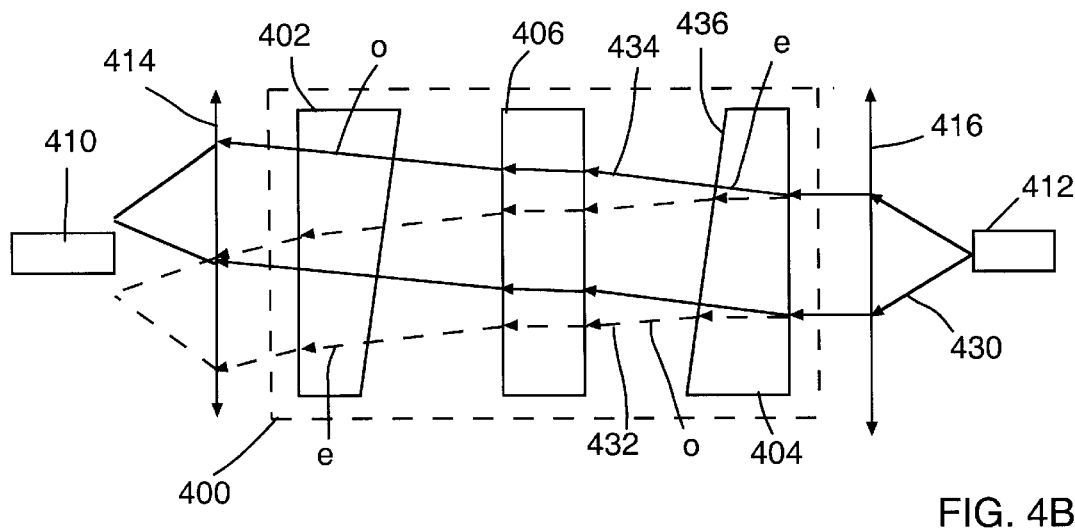

One particular embodiment of isolator module 400 is illustrated in FIGS. 4A and 4B. The isolator module is described in U.S. Pat. No. 4,548,478, incorporated herein by reference. The isolator module includes two birefringent crystals 402 and 404 that are wedge shaped. The wedge of the second crystal 404 is oriented in a direction opposite the wedge of the first crystal 402.

A non-reciprocal polarization rotator 406 is disposed between the two birefringent crystals 402 and 404. The non-reciprocal polarization rotator 406 may be a Faraday rotator or any other suitable optical element that non-reciprocally rotates the polarization of light passing therethrough.

The isolator module 400 is positioned between first and second fibers 410 and 412 and respective first and second collimating lenses 414 and 416. The passage of light from the first fiber 410 to the second fiber 412 is illustrated in FIG. 4A, while the passage of light from the second fiber 412 to the first fiber 410 is illustrated in FIG. 4B.

First, with respect to FIG. 4A, light 420 diverges from the first fiber 420 and is collimated by the first collimating lens 414. The collimated light enters the first birefringent crystal 402. Light passing through the first crystal 402 as an ordinary wave, labeled "o", propagates as a first ray 422 in a first direction, while light passing through the first crystal 402 as an extraordinary wave, labeled "e", propagates as a second ray 424 in a second direction different from the first direction. The first ray 422 is refracted at the angled surface 421 of the first crystal 402. The second ray 424 is incident on the angled surface 421 at a smaller angle of incidence than the first ray 422, and is refracted to a lesser extent. The second ray 424 may be normally incident on the angled surface 421.

The first and second rays 422 and 424 pass through the non-reciprocal polarization rotator 406, where the polarization of each ray is rotated through approximately 45°. The first and second rays 422 and 424 then propagate to the second birefringent crystal 404. The optical axis of the second birefringent crystal 404 is rotated 45° relative to the optical axis of the first birefringent crystal 402. Therefore, the first ray 422 passes through the second birefringent crystal 404 as an ordinary wave, while the second ray 424 passes through the second birefringent crystal as an extraordinary wave.

The two rays 422 and 424 emerge from the second birefringent crystal mutually parallel and are focused by the second collimating lens 416 into the second fiber 412. Thus, irrespective of the polarization of the light 420 transmitted by the first fiber 410, the light 420 is transmitted to the second fiber 412.

Next, we examine the propagation of light from the second fiber 412 to the first fiber 410 with reference to FIG. 4B. Light 430 diverges from the second fiber 412 and is collimated by the second collimating lens 416. The collimated light enters the second birefringent crystal 404. Light passing through the second birefringent crystal 404 as an ordinary wave, labeled "o", propagates as a first ray 432 in a first direction, while light passing through the second crystal 404 as an extraordinary wave, labeled "e", propagates as a second ray 434 in a second direction different from the first direction. The first ray 432 is refracted at the angled surface 436 of the second crystal 404. The second ray 434 is incident on the angled surface 436 at a smaller angle of incidence than the first ray 432, and is refracted to a lesser extent. The second ray 434 may be normally incident on the angled surface 436.

The first and second rays 432 and 434 pass through the non-reciprocal polarization rotator 406, where the polarization of each ray is rotated through approximately 45°. However, since the rays 432 and 434 are propagating in the opposite direction to the rays 422 and 424, the handedness of the polarization rotation is different. The first and second rays 432 and 434 then propagate to the first birefringent crystal 402. The optical axis of the first birefringent crystal 402 is rotated 45° relative to the optical axis of the second birefringent crystal 404. However, the direction of this relative rotation is opposite the direction of polarization rotation. Therefore, the first ray 432, having passed through the second crystal as an ordinary ray, passes through the first birefringent crystal 402 as an extraordinary wave, marked "e." Also, the second ray 434, having passed through the second crystal 404 as an extraordinary ray, passes through the first birefringent crystal 402 as an ordinary wave, marked "o".

In the forward direction, the two wedged birefringent crystals operate as a complementary prism pair, so that light exiting from the second crystal is parallel to the direction in which light entered the first crystal 402. In other words, the deviation caused by one wedge is compensated for by the other wedge. However, since light propagating in the backward direction passes through one crystal as an "o" ray and in the other crystal as an "e" ray, the two wedged crystals 402 and 404 do not act as a complementary prism pair, and the two rays 432 and 434 emerge from the first birefringent crystal 402 in different directions. Accordingly, neither ray 432 nor ray 434 is focused by the first collimating lens to the first fiber 410. Thus, irrespective of the polarization of the light 430 transmitted by the second fiber 412, the light 430 is not transmitted to the first fiber 410. Therefore, the isolator module 400 is effective as a polarization insensitive isolator.

Figure 5A:
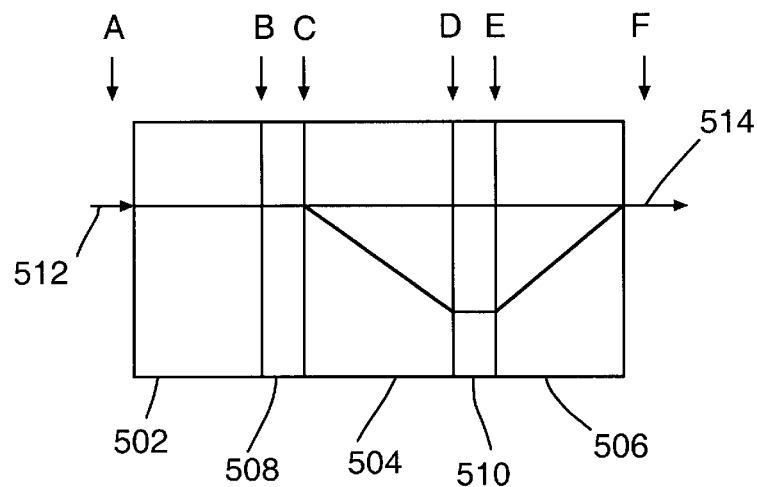
FIG. 5A schematically illustrates a second embodiment of an isolator module.

Another embodiment of an isolator module 500 is illustrated in FIG. 5A. This isolator module 500 is described in detail in U.S. Pat. No. 5,262,892, incorporated herein by reference. The isolator module 500 includes three birefringent crystals 502, 504 and 506. A first non-reciprocal polarization rotator 508 is disposed between the first and second crystals 502 and 504, and a second non-reciprocal polarization rotator 510 is disposed between the second and third crystals 504 and 506. The optical elements 502, 504, 506, 508 and 510 are substantially flat.

Figure 5B:
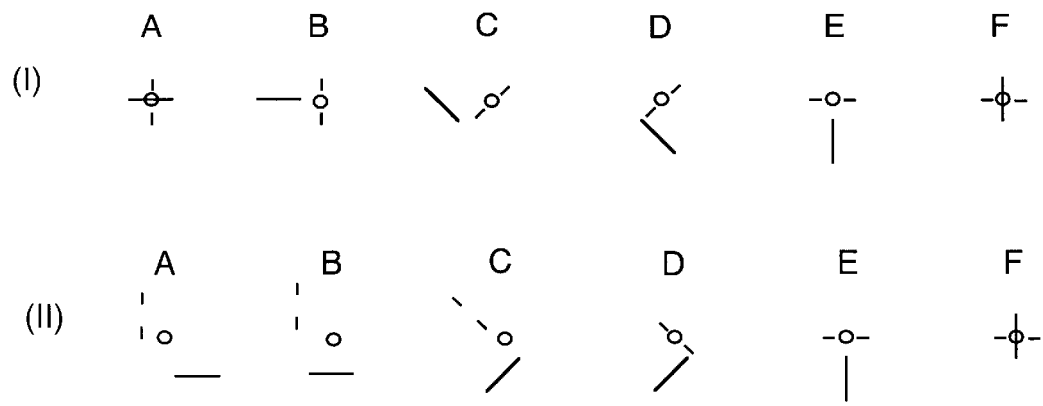
FIG. 5B illustrates the relative position of different polarization states at different points throughout the second embodiment of the isolator module illustrated in FIG. 5A.

FIG. 5B illustrates the manner in which orthogonal polarization states are transmitted through the isolator module 500, by showing the relative displacement of the different polarization components, at the respective points marked A–F, as the light progresses through the isolator module 500. The line marked (I) illustrates the polarization states as the light propagates from left to right, as viewed from the right hand side of the figure.

Prior to entry into the first crystal 502, the light beam 512 is composed of both polarization states, as indicated at position A. Upon entry into the first crystal 502, the light beam 512 is split into its ordinary and extraordinary components (A–B). The separated polarization components pass through the first non-reciprocal polarization rotator 508, where each component is subjected to a polarization rotation of 45° in the clockwise direction (C). the two components then pass into the second birefringent crystal 504, where the extraordinary component is displaced (D). Both polarization components are rotated by another 45° in the clockwise direction in the second non-reciprocal polarization rotator 510 (E). The two polarization components are combined into a single output beam 514 by the third crystal 506 (F), which is directed to the output fiber of the dual wavelength isolator fiber device.

Now consider light travelling in the reverse direction, for which the positions of the different polarization components are illustrated in line (II), as viewed from the left side of the figure. The light from the output fiber may be in a mixed polarization state (F). The ordinary and extraordinary polarization components are separated in the third crystal 506 (E). The separated polarization components are rotated by 45° in the clockwise direction by the second non-reciprocal polarization rotator 510 (D). The extraordinary polarization component is displaced on passage through the second birefringent crystal 504 (C). Both polarization components are rotated another 45° in the clockwise direction by the first non-reciprocal polarization rotator 508 (B). The polarization component that was not translated on passage through the second birefringent crystal 504 is translated upon passage through the first birefringent crystal 502 (A). Neither polarization component is returned to the optical axis 520 in the reverse direction, and so neither component is focused back into the input fiber by the collimating lens, and so the isolator module 500 is effective as a polarization insensitive isolator module.

It will be appreciated that other designs of isolator module may be employed: there is no intention to limit the type of isolator module used by the examples shown here. Other examples of isolator module that are applicable to the present invention are discussed in U.S. Pat. Nos. 5,237,445 and 5,262,892, both of which are incorporated by reference.

Figure 6:
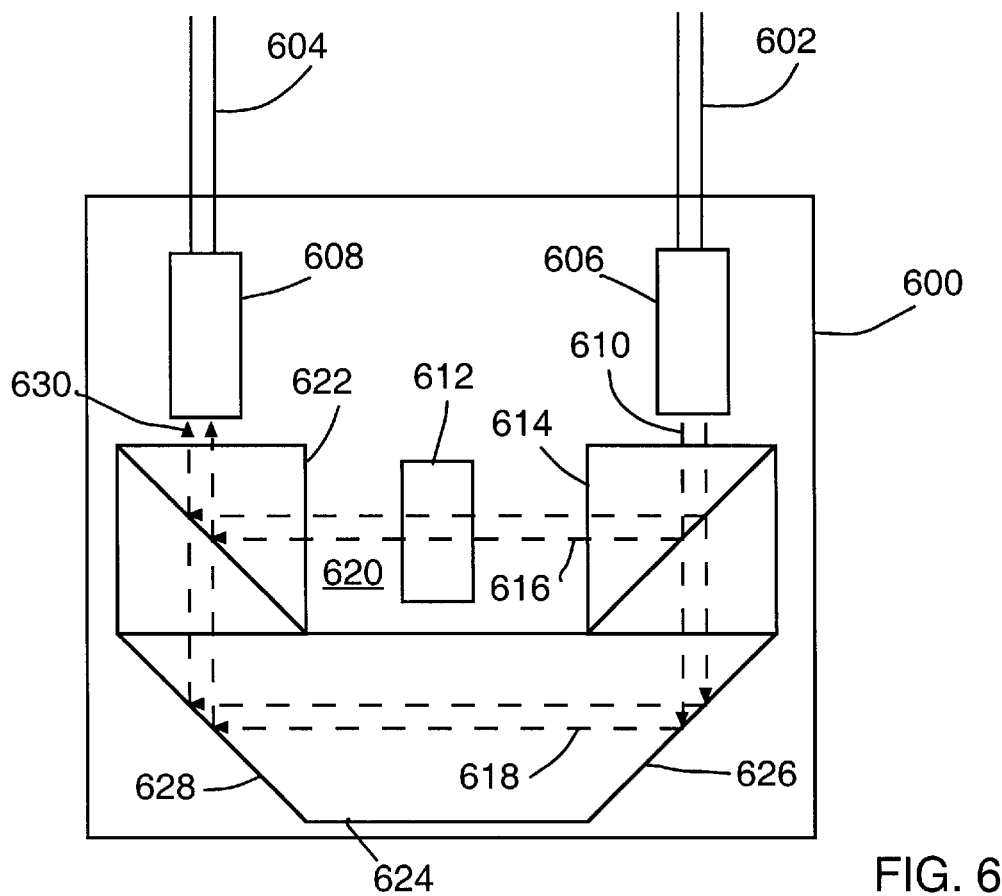
FIG. 6 schematically illustrates an embodiment of a multiwavelength isolator device according to the present invention.

Another particular embodiment of a fiber optic device operating at more than one wavelength is illustrated in FIG. 6. The device 600 has two fibers 602 and 604 that couple to the external fiber optic system. The device 600 is in a "terminal" configuration, having both fibers 602 and 604 at the same side of the package. An advantage of this configuration is that the length of the space required by the device is less than that for the "in-line" configuration of FIG. 2, since the fibers connecting to the device have a limited radius of curvature.

Each fiber 602 and 604 is terminated by a respective collimating lens 606 and 608 to reduce coupling losses between the two fibers 602 and 604. Light 610 propagating from the first fiber 602 contains two wavelength components, $\lambda 1$ and $\lambda 2$, which are separated by a wavelength separator 614 into two components 616 and 618 respectively, propagating along different optical paths. The first component 616, at $\lambda 1$, is reflected by the wavelength separator 614 and propagates through the free space region 620 between the wavelength separator 614 and the wavelength combiner 622. The first wavelength component 616 passes through the isolator module 612 positioned in the free space region 620.

The second wavelength component 618 is directed from the wavelength separator 614 along a path different from the path of the first wavelength component 616. A guiding prism 624 has two reflective surfaces 626 and 628 that direct the second wavelength component 618 to the wavelength combiner 622, where the first and second wavelength components 616 and 618 are combined into a single output beam 630 that propagates to the second collimating lens 608 and is focused into the second fiber 604.

Another particular embodiment of a fiber optic device operating at more than one wavelength, and in a "terminal" configuration, is illustrated schematically in FIG. 7A. Two fibers 702 and 704 couple the device 700 to the external fiber system. A view of the "terminal" package is illustrated FIG. 7B, illustrating the housing 750 with the fibers 702 and 704 connecting at the same end.

The two fibers 702 and 704 share a single collimating lens 706, which is typically a gradient index (GRIN) lens. The output beam 708 from the first fiber 702 exits collimated from the collimating lens 706, but propagating at an angle relative to the axis 707 of the lens 706. A parallelizing optic 710 may be used to divert the beam 708 to be parallel to the axis 707. The parallelizing optic 710 may be, for example, a lens or a prism.

The collimated beam 708 is incident on a wavelength separator 714, which, in this particular embodiment, is a dichroic mirror on a substrate. The wavelength separator 714 reflects the first wavelength component 716 at $\lambda 1$, and transmits the second wavelength component 718 at $\lambda 2$. The two wavelength components are recombined at the wavelength combiner 722, which may be a dichroic mirror on a substrate. The first wavelength component 716 at $\lambda 1$ passes through the isolator module 712 between the wavelength separator and combiner 714 and 722, providing isolation at $\lambda 1$.

The second wavelength component 718 at $\lambda 2$ is directed by a reflecting surfaces 726 and 728 of a prism 724 to the wavelength combiner 722, where the two different wavelength components 716 and 718 are recombined. The second wavelength component 718 may pass through one or more isolator modules 740 and 742 before recombining with the first wavelength component 716.

Figure 8:
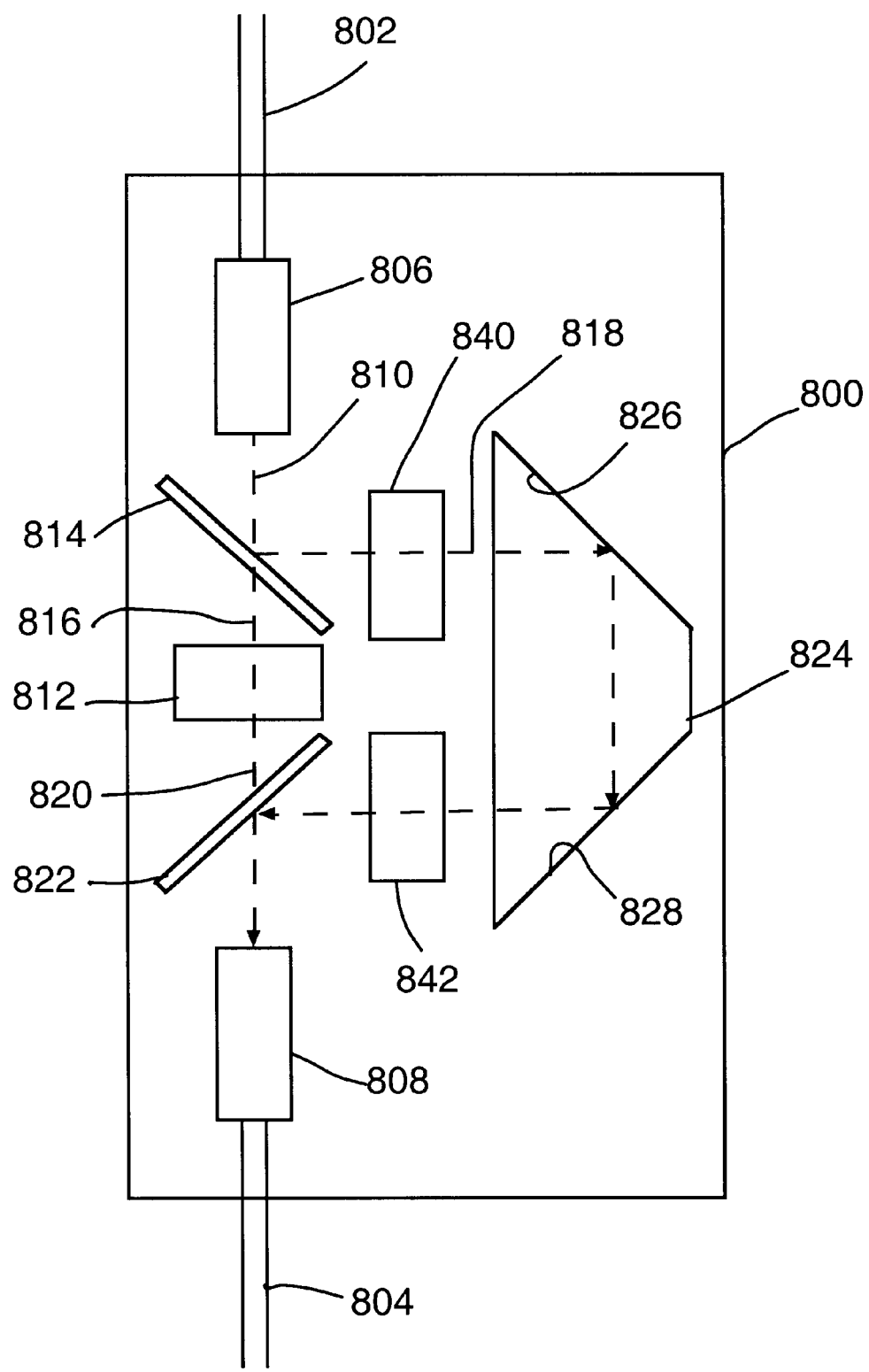
FIGS. 8–11 schematically illustrate additional embodiments of a multiwavelength isolator device according to the present invention.

Another particular embodiment of a fiber optic isolator device 800 providing isolation at more than one wavelength is illustrated in FIG. 8. The device 800 employs similar components for separating and combining the different wavelength components as in the device 800, but in "in-line" configuration. Two fibers 802 and 804 couple the device 800 to the external fiber system. The two fibers 802 and 804 each have a respective collimating lens 806 and 808, which may be a GRIN lens.

The collimated output beam from the first fiber 802 is incident on a wavelength separator 814, which, in this particular embodiment, is a dichroic mirror on a substrate. The wavelength separator 814 transmits the first wavelength component 816 at $\lambda 1$, and reflects the second wavelength component 818 at $\lambda 2$. The two wavelength components 816 and 818 are recombined at the wavelength combiner 822, which may be a dichroic mirror on a substrate. The first wavelength component 516 at $\lambda 1$ passes through the first isolator module 812 positioned between the wavelength separator and combiner 814 and 822.

The second wavelength component 818 at $\lambda 2$ is directed by a reflecting surfaces 826 and 828 of a prism 824 to the wavelength combiner 822, where the two different wavelength components 816 and 818 are recombined. The second wavelength component 818 may pass through one or more isolator modules 840 and 842 operating at $\lambda 2$, before recombining with the first wavelength component 816.

Another particular embodiment of a multiwavelength isolator device 900 operating is illustrated in FIG. 6. This embodiments uses a different type of wavelength separator and combiner and has a "terminal" configuration, and provides isolation at two wavelengths.

Two fibers 902 and 904 couple the device 900 to the external fiber system. The two fibers 902 and 904 share a single collimating lens 906 and a parallelizing optic 910 in a manner as described above with regard to FIG. 7.

The collimated beam 908 output from the first fiber 902 is incident on a wavelength separator 914, which, in this particular embodiment, includes a beamsplitter cube 916 and a turning prism 917. A dichroic reflector 915 in the beamsplitter cube 916 reflects the first wavelength component 920 at $\lambda 1$ and transmits the second wavelength component 921 at $\lambda 2$. The reflecting face 918 of the turning prism 917 reflects the second wavelength component 921 to be parallel to the first wavelength component 920.

The two wavelength components 920 and 921 are recombined at the wavelength combiner 922, which is similar to the wavelength separator, having a beamsplitting cube 923 and a turning prism 925. The reflecting face 924 of the turning prism 925 reflects the second wavelength component 921 so that it recombines with the first wavelength component 920 at the dichroic reflector 926 of the beamsplitting cube 923. The combined output beam 930 passes through the parallelizing optic 910 and is focused by the collimating lens 906 into the second fiber 904.

This arrangement provides a free space propagation region between the wavelength separator 914 and the wavelength combiner 922 which allows the placement of a first isolator module 932 in the path of the first wavelength component 920 and a second isolator module optical 934 in the path of the second wavelength component 921.

Figure 9:
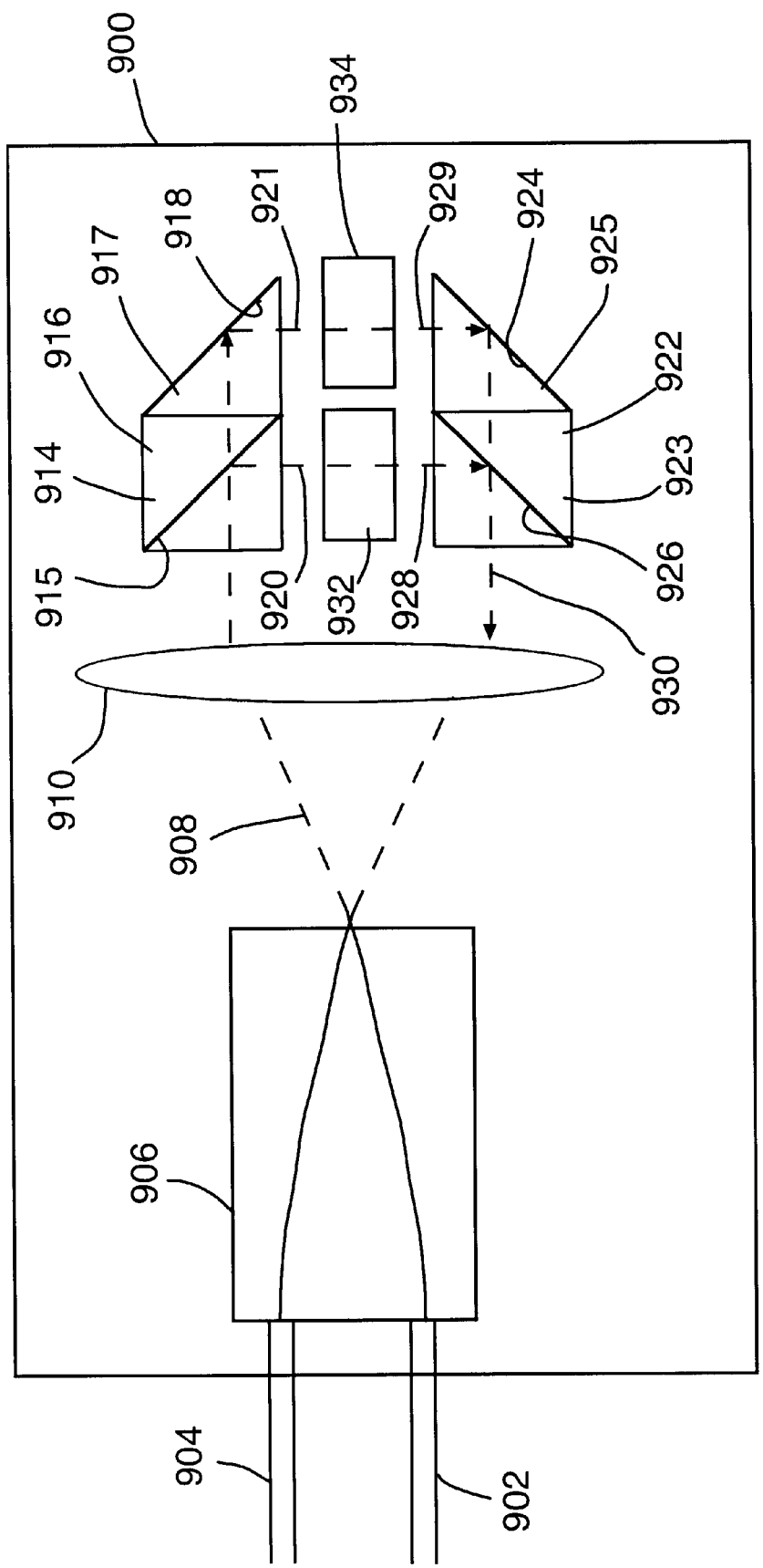
Figure 10:
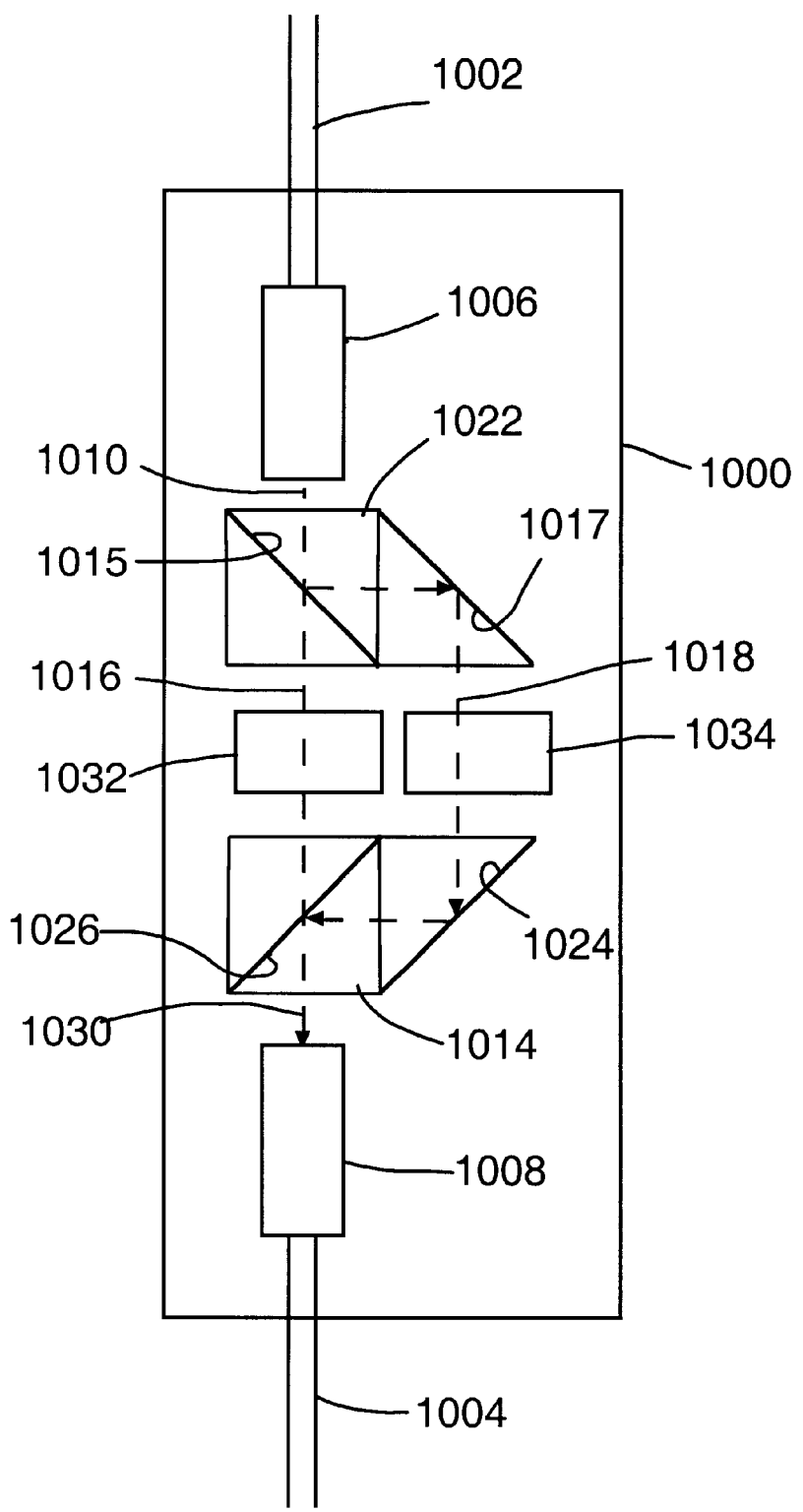

Another particular embodiment of a multiwavelength isolator device 1000 is illustrated in FIG. 10. This embodiment uses a wavelength separator and combiner that are similar to those described above in FIG. 9, but is arranged in an "in-line" configuration. This embodiment also provides isolation at both wavelengths.

Two fibers 1002 and 1004 couple the device 1000 to the external fiber system. The two fibers 1002 and 1004 each have respective collimating lenses 1006 and 1008. The collimated beam 1010 output from the first fiber 1002 is incident on a wavelength separator 1014, which reflects the first wavelength component 1016 at a dichroic surface and reflects the second wavelength component 1018 at an internal prism surface 1017.

The two wavelength components 1016 and 1018 are recombined at the wavelength combiner 1022, which is similar to the wavelength separator 1014. The second wavelength component 1018 is reflected at a prism surface 1024, and recombined with the first wavelength component 1016 at a dichroic reflector 1026 which transmits the first wavelength component 1016 and reflects the second wavelength component 1018. The combined output beam 1030 propagates to the collimating lens 1008 and is focused into the second fiber 1004.

This arrangement provides a free space propagation region between the wavelength separator 1014 and the wavelength combiner 1022 which allows the placement of a first isolator module 1032 in the path of the first wavelength component 1016 and a second isolator module 1034 in the path of the second wavelength component 1018.

Figure 11:
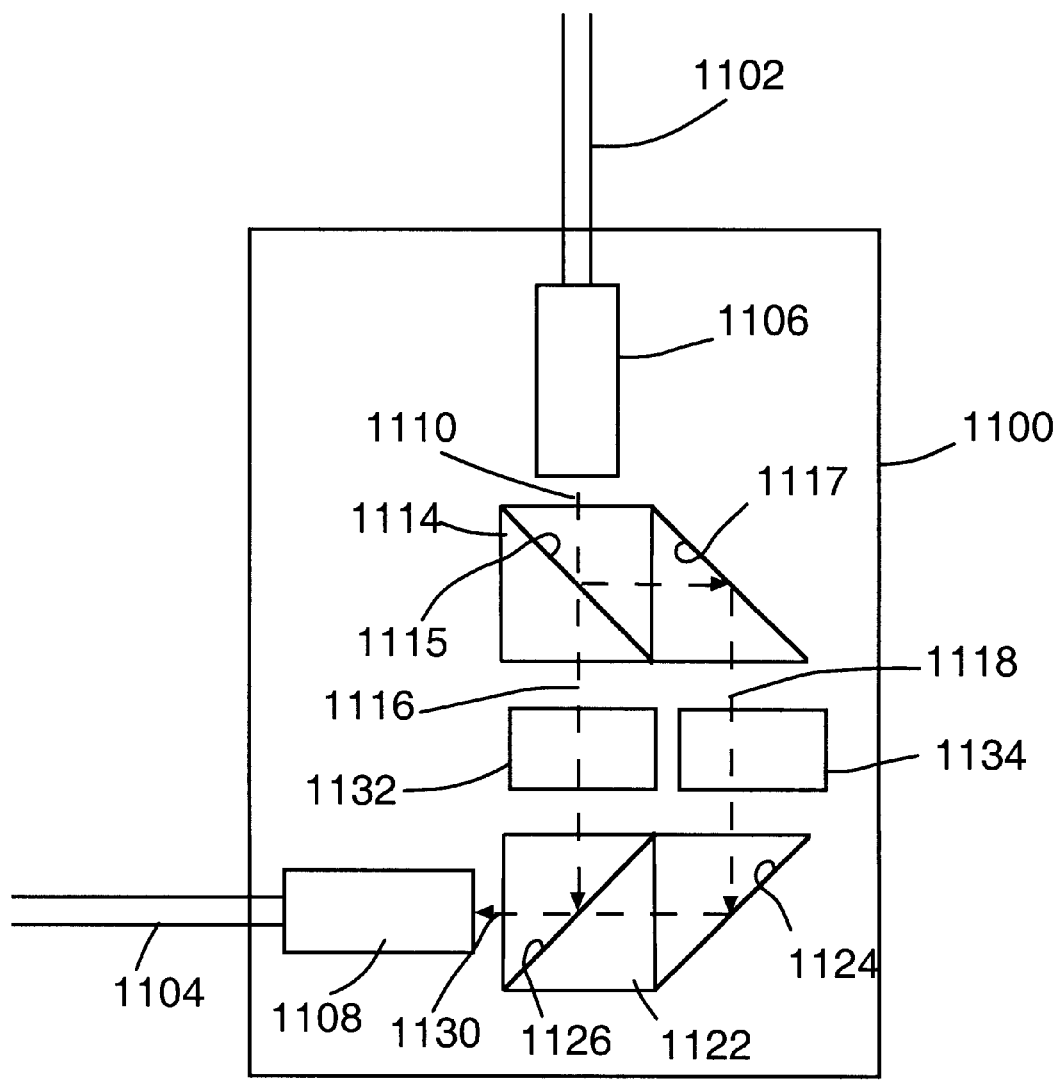

Another particular embodiment of a multiwavelength isolator device 1100 is illustrated in FIG. 11. This embodiment uses a wavelength separator and combiner that are similar to those described above in FIG. 9, but is arranged in a "corner" configuration, in which one coupling fiber is positioned at an angle relative to the other, unlike the previously described embodiments where the coupling fibers are substantially parallel. This arrangement may be useful in applications where the fiber arrangements of the "in-line" or "terminal" configurations are unsuitable, for example because of limited availability of space to accommodate the minimum bending radius of a fiber. Isolation may be provided at both wavelengths.

Two fibers 1102 and 1104 couple the device 1100 to the external fiber system. The two fibers 1102 and 1104 each have respective collimating lenses 1106 and 1108. The collimated beam 1110 output from the first fiber 1102 is incident on a wavelength separator 1114, which transmits the first wavelength component 1116 at a dichroic reflector 1115. The second wavelength component 1118 is reflected at the dichroic reflector to a reflecting surface 1117, in this case an internally reflecting prism surface, which reflects the second wavelength component 1118 to a reflecting surface 1124 of the wavelength combiner 1122.

The two wavelength components 1116 and 1118 are recombined at the wavelength combiner 1122, which is similar to the wavelength separator 1114, except that the dichroic reflector 1126 reflects the first wavelength component 1116 and transmits the second wavelength component 1118. The combined output beam 1130 propagates to the collimating lens 1108 and is focused into the second fiber 1104.

This arrangement provides a free space propagation region between the wavelength separator 1114 and the wavelength combiner 1122 which allows the placement of a first isolator module 1132 in the path of the first wavelength component 1116 and a second isolator module 1134 in the path of the second wavelength component 1118.

Figure 12:
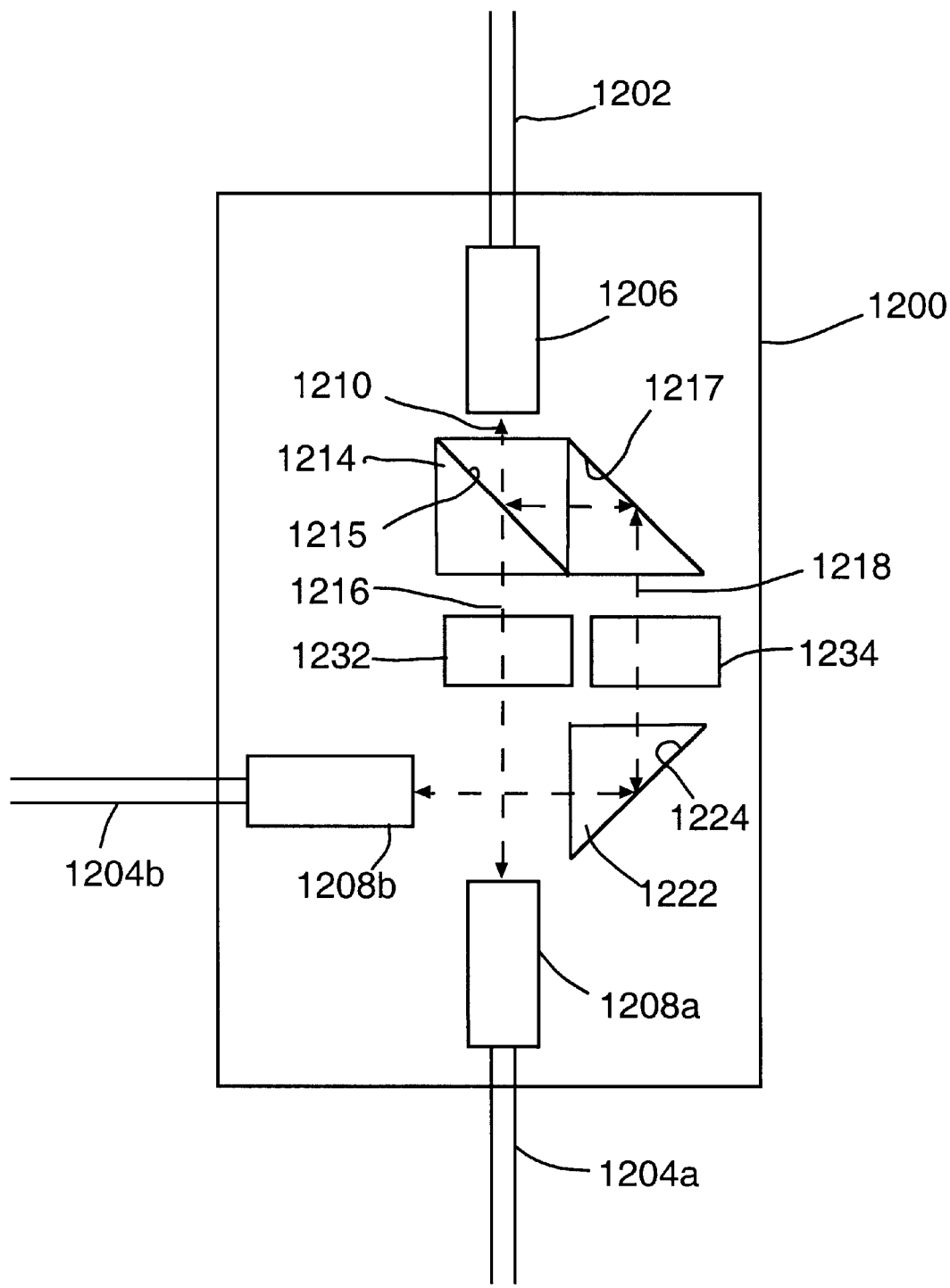
FIGS. 12 and 13 schematically illustrate embodiments of a multiple wavelength separator/combiner device according to the present invention.

Another particular embodiment of a multiwavelength isolator device 1200 is illustrated in FIG. 12. This embodiment is a variation of the embodiments illustrated in FIGS. 10 and 11, and may be used for separating or combining different wavelength components. This embodiment is arranged in a "corner" configuration, and may provide isolation at both wavelengths.

Three fibers 1202, 1204a and 1204b couple the device 1200 to the external fiber system. Each fiber 1202, 1204a and 1204b has a respective collimating lens 1206, 1208a and 1208b. Like all the other embodiments described, light may pass through the device in both directions. Here, we initially describe passage of light from the first fiber 1202 to the other fibers 1204a and 1204b. The collimated beam 1210 output from the first fiber 1202 is incident on a wavelength separator 1214, which reflects the first wavelength component 1216 at a dichroic surface 1215 and reflects the second wavelength component 1218 at an internal prism surface 1217.

The first wavelength component 1216 propagates through the first isolator module 1232 and passes to the second fiber 1204a via the collimating lens 1208a. The second wavelength component 1218 is separated from the first wavelength component 1216 by reflection at the dichroic reflector 1215. The second wavelength component 1218 is directed by the reflecting surface 1217 to the third collimating lens 1208b and the third fiber 1204b. The second wavelength component 1218 may be directed via a first reflecting surface 1217 and a second reflecting surface 1224. A second isolator module 1234 may be placed in the path of the second wavelength component 1218.

It will be appreciated that the device 1200 may be used for separating wavelength components as just described, and also for combining wavelength components. For example, a first wavelength component propagating from the second fiber 1204a to the first fiber 1202 may be combined at the dichroic reflector 1215 with a second wavelength component propagating from the third fiber 1204b. The combined beam, containing both wavelength components, propagates to the first fiber 1202, where it is coupled to an external fiber system.

The different fibers may be positioned differently from the "in-line/corner" arrangement illustrated in FIG. 12. For example, the third fiber 1204b may be positioned parallel to the second fiber 1204a, as illustrated for the device 1300 in FIG. 13. Here, the turning prism 1222 is omitted, so that the second wavelength component 1218 enters the third fiber 1204b in a direction parallel to the first wavelength component 1216.

Figure 13:
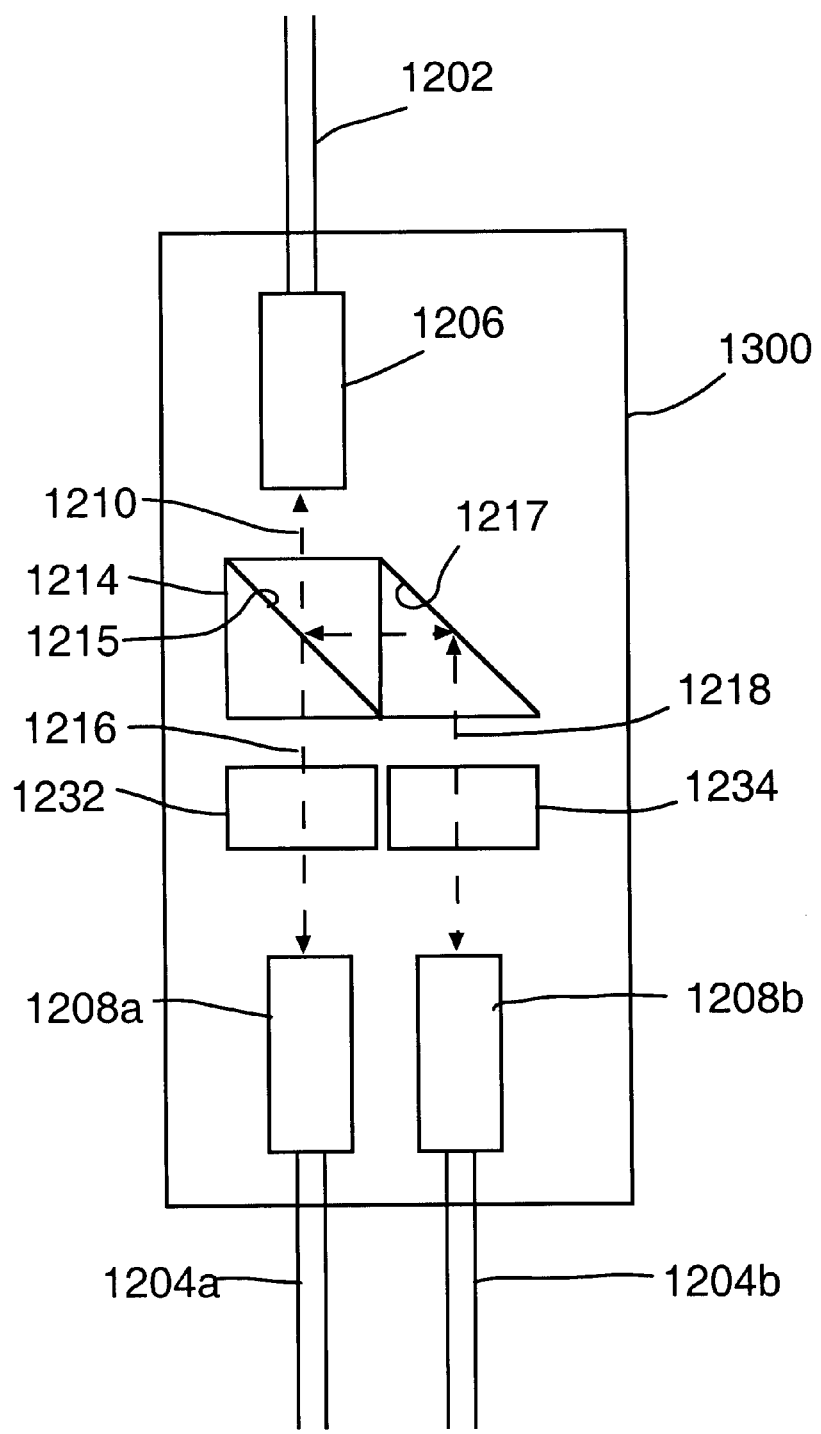

The "in-line" arrangement of FIG. 13 provides an advantage over the embodiment illustrated in FIG. 13 in that the overall package size for the device may be reduced. It should be appreciated that, instead of the two fibers 904a and 904b each having their respective collimating lens 908a and 908b, the fibers 904a and 904b may be coupled to the wavelength combiner 914 via a single collimating lens and a parallelizing optic, for example as shown in FIG. 7.

It will also be appreciated that many different configurations may be adopted for a fiber optic device that combines different wavelengths or separates different wavelengths. For example, the turning prism having the reflecting face 1217 may be omitted altogether, and the third fiber positioned to receive or direct the second wavelength component directly from or to the dichroic reflector 1215. Also, different reflecting surfaces may be included in the fiber optic device 1300 so that the second and third fiber are both on the same side of the fiber optic device, for example in a "corner" configuration or in a "terminal" configuration. Furthermore, the second and third fibers may terminate on different sides of the fiber optic device, for example in a "T" configuration, with any of the fibers forming the base of the "T", or in a mixed configuration, for with two fibers on the same side and the third fiber on a different side of the device 1300.

Figure 14:
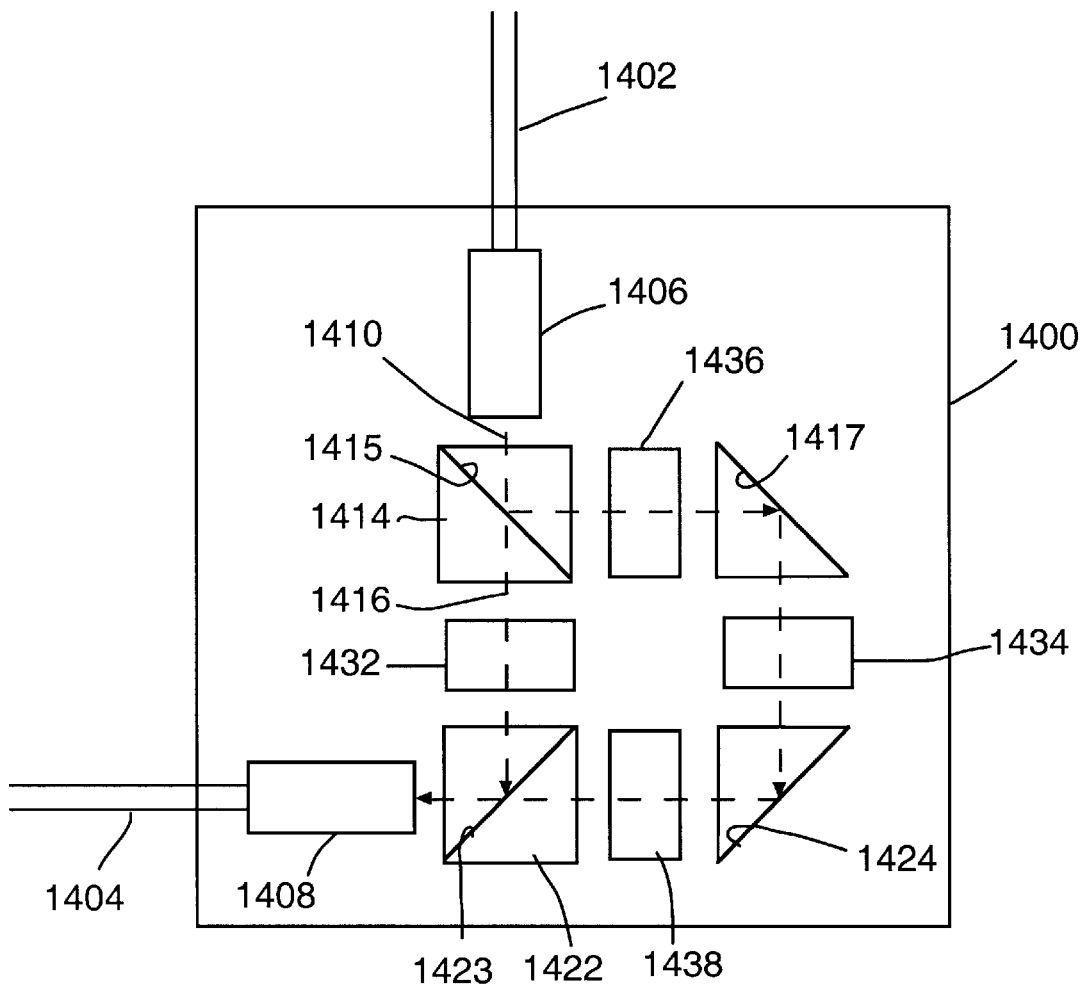
FIG. 14 schematically illustrates an embodiment of a multiwavelength isolator device according to the present invention.

Another particular embodiment of a multiwavelength isolator device 1400 is illustrated in FIG. 14. This embodiment has some similarities to the embodiment illustrated in FIG. 11, but provides additional capabilities for inserting different isolator modules for at least one of the wavelength components.

Two fibers 1402 and 1404 couple the device 1400 to the external fiber system, The two fibers 1402 and 1404 each have respective collimating lenses 1406 and 1408. The collimated beam 1410 output from the first fiber 1402 is incident on a wavelength separator 1414, which transmits the first wavelength component 1416 and reflects the second wavelength component 1418 at a dichroic reflector 1415. The second wavelength component 1418 is reflected by to reflectors 1417 and 1424 to the wavelength combiner 1422. In this case, the reflectors 1417 and 1424 are internally reflecting prism surfaces, but may also be other types of reflectors.

The two wavelength components 1416 and 1418 are recombined at the wavelength combiner 1422, which is similar to the wavelength separator 1414, except that the first wavelength component 1416 is reflected at the dichroic reflector 1423 and the second wavelength component 1418 is transmitted through the dichroic reflector 1423. The combined output beam 1430 propagates to the collimating lens 1408 and is focused into the second fiber 1404.

This arrangement provides a different positions where isolator modules devices 1432, 1434, 1436 and 1438 may be inserted to operate on the respective wavelength components.

Figure 15:
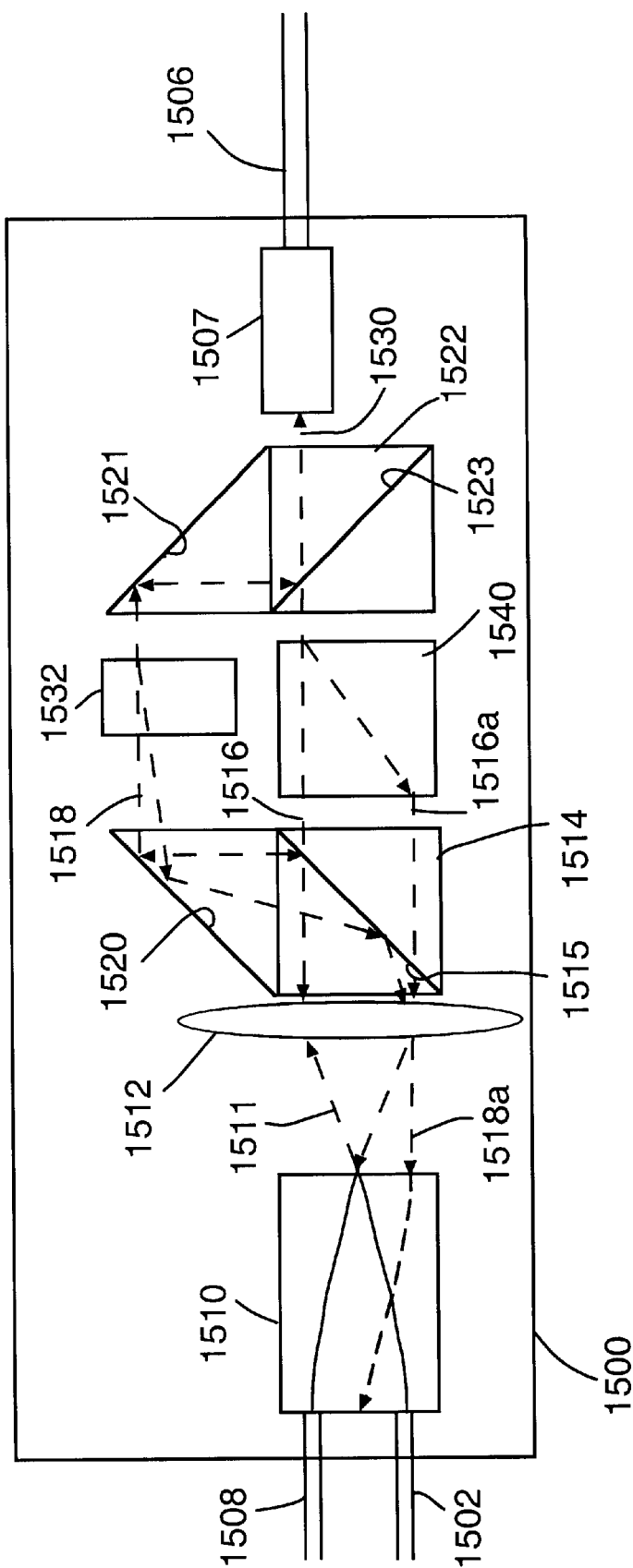
FIG. 15 schematically illustrates an embodiment of a multiwavelength isolator device providing isolation at one wavelength and circulation at another wavelength.

It should be appreciated that, where isolation is provided for two wavelength components in the embodiments described above, there may be isolation only at one wavelength. The other wavelength may be provided with any other type of optical device, such as an optical switch, modulator, filter, circulator, or the like. One particular embodiment of a fiber optic device 1500 operating at two wavelengths is illustrated in FIG. 15. The device 1500 provides isolation at one wavelength and circulation and the other wavelength. A first fiber 1502 couples to an external fiber system. The output from the first fiber 1502 is collimated by the collimating lens 1510 and is parallelized by the parallelizing optic 1512, for example in a manner as described with regard to the embodiment illustrated in FIG. 7. A second fiber 1506 is coupled to the external fiber system, and has a collimating lens 1507 for collimating light output from the second fiber 1506 and for focusing light into the second fiber 1506.

Light 1511 at two wavelengths, $\lambda 1$ and $\lambda 2$, is transmitted from the first fiber 1502 into a wavelength separator 1514, which may be a beamsplitter cube having a dichroic reflector 1515. The first wavelength component 1516 is transmitted by the dichroic reflector 1515 to the circulator 1540, and is transmitted to the wavelength combiner 1522, which may be a beamsplitter cube having a dichroic reflector 1523. The first wavelength component 1516 is transmitted through the dichroic reflector 1523. The second wavelength component 1518 is reflected at the dichroic reflector 1515 and directed to the wavelength combiner 1522 along a path different from the first wavelength component 1516, avoiding passage through the circulator 1540. The second wavelength component 1518 may be reflected by first and second reflecting surfaces 1520 and 1521 to the wavelength combiner 1522, where it is reflected by the dichroic reflector 1523. The first wavelength component 1516 transmitted by the dichroic reflector 1523 and the second wavelength component 1518 reflected by the dichroic reflector 1523 form a combined output 1530 that propagates to the second fiber 1506. The reflecting surfaces 1520 and 1521 may be internally reflecting prism surfaces, as illustrated, or front surface mirrors or the like.

An isolator module 1532 may be provided in the path of the second wavelength component 1518, between the separator 1514 and the combiner 1522. The isolator module 1532 permits passage of light at the second wavelength from the first fiber 1202 to the second fiber 1206.

We now consider light, at the two wavelengths $\lambda 1$ and $\lambda 2$, passing from the second fiber 1506 back through the device 1500. The reverse-propagating light is split into the two wavelength components at the combiner 1522, by transmitting the first wavelength component 1516 through the dichroic reflector 1523 and reflecting the second wavelength component 1518. The second wavelength component 1518 retraces the path via the reflector 1521 to the isolator module 1532. The isolator module deviates the second wavelength component 1518 along a different path 1518a so that the light at the second wavelength does not return to the first fiber 1502 and does not pass to the third fiber 1508.

The first wavelength component 1516, however, is deviated by the circulator 1540 onto a different path 1516a, which is transmitted through the dichroic reflector 1515. The first wavelength 1516a component on the different path does not return to the first fiber, but passes through the parallelizing optic 1512 and the collimating lens 1510 to a third fiber 1508. Thus, the device 1500 provides circulation at the first wavelength while providing isolation at the second wavelength.

The invention is not restricted to only those embodiments discussed above, but covers various modifications and changes from the specific embodiments. For example, the invention has been described with regard to two wavelength components. It will be appreciated that more than two wavelength components may be present. In such a case, one component may be separated from the other components, or different components may be separated out. For example, where three wavelength components are present, the component at $\lambda 1$ may be separated from the other two components, $\lambda 2$ and $\lambda 3$. The two components $\lambda 2$ and $\lambda 3$ may then be separated from each other, or they may remain mixed.

It will also be appreciated that the isolator modules positioned within the multiwavelength isolator device may be orientated in different directions. Thus, a multiwavelength isolator device may permit passage of light at one wavelength through the device in one direction, while permitting light at a second wavelength to pass through the device in the opposite direction.

It will also be appreciated that more than one isolator module may be employed where only one was shown in the figures to provide a higher degree of extinction. For example, with regard to the embodiment illustrated in FIG. 6, the first wavelength component 616 may pass through more than one isolator module between the wavelength separator 614 and the wavelength combiner 622. It will further be appreciated that many different configurations and arrangements of reflectors may be used in the multiwavelength fiber optic device.

As noted above, the present invention is applicable to fiber optic systems and is believed to be particularly useful in systems that operate at more than one wavelength. Accordingly, the present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill to which the present invention is directed upon review of the present specification. The claims are intended to cover such modifications and devices.

We claim:

1. A fiber optic isolator device, comprising:

a first optical fiber optically coupled to transmit light at first and second wavelengths along a first optical path;

a wavelength separator disposed on the first optical path and adapted to direct light at the first wavelength along a second optical path and light at the second wavelength along a third optical path different from the second optical path;

a wavelength combiner optically coupled to combine light propagating along the second and third optical paths into a fourth optical path;

a second optical fiber optically coupled to the fourth optical path;

a first optical isolator module disposed along the second optical path between the wavelength separator and the wavelength combiner; and a first collimating lens disposed to couple light between the first optical fiber and the first optical path, and to couple light between the second optical fiber and the fourth optical path.

2. A device as recited in claim 1, further comprising a second optical isolator module disposed along the third optical path between the wavelength separator and the wavelength combiner to isolate light at the second wavelength.

3. A device as recited in claim 2, wherein the second optical isolator module is oriented to pass light at the second wavelength from the first fiber to the second fiber and to substantially block light at the second wavelength from passing from the second fiber to the first fiber.

4. A device as recited in claim 2, wherein the second optical isolator module is oriented to pass light at the second wavelength from the second fiber to the first fiber and to substantially block light at the second wavelength from passing from the first fiber to the second fiber.

5. A device as recited in claim 1, further comprising a housing containing the wavelength separator, the wavelength combiner and the first optical isolator module.

6. A device as recited in claim 1, further comprising a parallelizing optic disposed between the collimating lens and both the wavelength separator and wavelength combiner.

7. A device as recited in claim 1, wherein the wavelength separator is a dichroic mirror.

8. A device as recited in claim 1, wherein the wavelength combiner is a dichroic mirror.

9. A device as recited in claim 1, wherein the wavelength separator is a polarization separator.

10. A device as recited in claim 1, wherein the first optical isolator comprises a first wedge of birefringent material having a wedge orientation in a first direction, a non-reciprocal polarization rotator and a second wedge of birefringent material having a wedge orientation in a second direction opposite the first direction, all disposed along the second path, wherein the non-reciprocal polarization rotator is disposed between the first and second wedge.

11. A device as recited in claim 1, wherein the first optical isolator comprises first, second and third birefringent crystals disposed along the second optical path, the first birefringent crystal being closest on the second optical path to the wavelength separator and the third birefringent crystal being closest on the second optical path to the wavelength combiner, and a non-reciprocal polarization rotator disposed between the first and second birefringent crystals.

12. A device as recited in claim 1, wherein the first wavelength is approximately 1.55 µm.

13. A device as recited in claim 12, wherein the second wavelength is approximately 1.3 µm.

14. A device as recited in claim 1, wherein the difference between the first and second wavelengths is at least 20 nm.

15. A device as recited in claim 1, wherein the first and second fibers are coupled to an external fiber optic system having a transmitter and a receiver and the first optical isolator module is oriented in to permit passage of light from the transmitter to the receiver.

16. A fiber optic device, comprising:
wavelength separating means for separating a light beam into a first light beam containing light at a first wavelength and a second light beam containing light at a second wavelength different from the first wavelength, the first and second beams respectively propagating along first and second beam paths;
optical isolating means disposed on the first beam path for passing light in the first wavelength from the wavelength splitting means to the wavelength combining means, and for blocking light at the first wavelength from passing from the wavelength combining means to the wavelength splitting means;
wavelength combining means for combining light propagating in the first direction along the first beam path, and light propagating in the first direction along the second beam path into a single output beam; and
light collimating and focusing means for changing divergence of light passing therethrough, the light collimating and focusing means being common to light entering and exiting the device through first and second ports of the device.

17. An optical device, comprising:
a first optical port and a second optical port;
a first optical path defined for light of a first wavelength between the first and second optical ports;
a second optical path defined for light of a second wavelength between the first and second optical ports, at least a portion of the first optical path being separate from the second optical path;
a first optical isolator module disposed in the portion of the first optical path separate from the second optical path; and
a focusing unit disposed to substantially collimate light propagating along the first optical path from the first optical port and to focus the substantially collimated light propagating along the first optical path to the second port.

18. A device as recited in claim 17, wherein the first and second optical ports comprise respective first and second optical fibers, the first and second optical fibers being located at a first end of the device.

19. A device as recited in claim 17, further comprising a second optical isolator module disposed on the second optical path at a portion of the second optical path separated from the first optical path.

20. A device as recited in claim 19, wherein the first optical isolator module is oriented to pass light at the first wavelength propagating from the first optical port to the second optical port and the second optical isolator module is oriented to pass light at the second wavelength propagating from the first optical port to the second optical port.

21. A device as recited in claim 19, wherein the first optical isolator module is oriented to pass light at the first wavelength propagating from the first optical port to the second optical port and the second optical isolator module is oriented to pass light at the second wavelength propagating from the second optical port to the first optical port.

22. A device as recited in claim 17, further comprising a wavelength separator and a wavelength combiner disposed on the first optical path to define the portion of the first optical path separate from the second optical path.

23. A device as recited in claim 22, wherein at least one of the wavelength separator and the wavelength combiner is a dichroic mirror.

24. A device as recited in claim 22, wherein at least one of the wavelength separator and the wavelength combiner is a polarization sensitive element.

25. A device as recited in claim 17, wherein the focusing unit includes a first sub-unit to focus and collimate light passing therethrough.

26. A device as recited in claim 25, wherein the focusing unit further includes a second sub-unit to parallelize light passing out of the focusing unit towards the first optical isolator module with light passing into the focusing unit from the optical isolator module.

27. A device as recited in claim 17, wherein the first optical isolator comprises a first wedge of birefringent material having a wedge orientation in a first direction, a second wedge of birefringent material having a wedge orientation in a second direction opposite the first direction and a non-reciprocal polarization rotator disposed between the first and second wedges.

28. A device as recited in claim 17, wherein the difference between the first and second wavelengths is at least 20 nm.

29. A device as recited in claim 17, wherein the first and second optical ports include respective first and second optical fibers coupled to an external fiber optic system having a transmitter and a receiver and the first optical isolator module is oriented in to permit passage of light from the transmitter to the receiver.

* * * * *